United States Patent
Nakayama

(10) Patent No.: US 9,577,464 B2
(45) Date of Patent: Feb. 21, 2017

(54) WIRELESS CHARGING SYSTEM

(75) Inventor: Takeshi Nakayama, Tokyo (JP)

(73) Assignee: Hitachi Power Solutions Co., Ltd., Ibaraki (JP)

( * ) Notice: Subject to any disclaimer, the term of this patent is extended or adjusted under 35 U.S.C. 154(b) by 220 days.

(21) Appl. No.: 14/379,596

(22) PCT Filed: Feb. 27, 2012

(86) PCT No.: PCT/JP2012/054819
§ 371 (c)(1),
(2), (4) Date: Sep. 3, 2014

(87) PCT Pub. No.: WO2013/128554
PCT Pub. Date: Sep. 6, 2013

(65) Prior Publication Data
US 2015/0002091 A1    Jan. 1, 2015

(51) Int. Cl.
*H02J 7/00* (2006.01)
*H02J 7/02* (2016.01)
(Continued)

(52) U.S. Cl.
CPC .............. *H02J 7/025* (2013.01); *B60L 11/182* (2013.01); *H01F 38/14* (2013.01); *H02J 7/0042* (2013.01); *H02J 7/0052* (2013.01); *B60L 2200/26* (2013.01); *H01M 2220/00* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........................................................ H02J 7/025
USPC ........................................................ 320/108
See application file for complete search history.

(56) References Cited

U.S. PATENT DOCUMENTS 5,598,134 A * 1/1997 Ito .................. B60L 11/182
336/210
5,814,900 A * 9/1998 Esser .................. H01F 38/18
307/104

FOREIGN PATENT DOCUMENTS

JP    2000-152512 A    5/2000
JP    2005-224045 A    8/2005
(Continued)

OTHER PUBLICATIONS

International Preliminary Report on Patentability received in International Application No. PCT/JP2012/054819 dated Sep. 12, 2014.
(Continued)

*Primary Examiner* — Edward Tso
*Assistant Examiner* — Ahmed Omar
(74) *Attorney, Agent, or Firm* — Mattingly & Malur, PC

(57) ABSTRACT

A wireless charging system includes a first winding portion, a second winding portion which is disposed with an interval between the first winding portion and the second winding portion in an axis direction of the first winding portion, and a pair of magnetic members which are disposed so as to sandwich the first winding portion and the second winding portion in the axis direction. In this case, protrusion portions which protrude toward the other magnetic member are provided in one magnetic member. Also, the magnetic member is held so as to be able to move forward and backward toward the other magnetic member. As a result, since the coefficient of magnetic coupling between a transmitting unit and a receiving unit during charging is enhanced, a charging efficiency can be enhanced.

6 Claims, 9 Drawing Sheets

(51) Int. Cl.
*H01F 38/14* (2006.01)
*B60L 11/18* (2006.01)

(56) References Cited

FOREIGN PATENT DOCUMENTS

| | | |
|---|---|---|
| JP | 2008-087733 A | 4/2008 |
| JP | 2008-120357 A | 5/2008 |
| JP | 2008-215028 A | 9/2008 |
| JP | 4356844 B2 | 8/2009 |
| JP | 2011-151351 A | 8/2011 |
| JP | 2014-023315 A | 2/2014 |

OTHER PUBLICATIONS

Extended European Search Report received in corresponding European Application No. 12869746.3 dated Sep. 16, 2015.

\* cited by examiner

WIRELESS CHARGING SYSTEM

TECHNICAL FIELD

The present invention relates to a wireless charging system which supplies electric power by utilizing a mutual interaction of electromagnetic induction.

BACKGROUND ART

A charging system is configured to feed electric power from an electric power system to a secondary battery mounted to an electric moving vehicle to thereby store power in the secondary battery. One of the examples of such charging systems is a wireless charging system in which the electric power system is not connected to the secondary battery in a wired manner. With regard to a technique relating to the wireless charging system, there is known one including a wiring (primary coil) on a transmitting unit side and a wiring (secondary coil) on a receiving unit side which have a structure in which an electric wire is wound in a flattened manner and flat plate-like magnetic cores around which the two wirings are wound (refer to JP-4356844-B). A so-called wired charging system requires a driver of the electric moving vehicle to do some operations including carrying out connection to a plug for electric power feeding installed in a charging station after getting off the vehicle. However, if the wireless charging system is used, the electric power can be supplied from the transmitting unit including the electric power system to the receiving unit having the secondary battery by use of a mutual interaction of electromagnetic induction. As a result, the driver will not have to get on and off the vehicle, and thus his or her convenience will be improved. This kind of technique, however, raises a problem that the wireless connection between the transmitting unit and the receiving unit causes the charging efficiency to be lower.

To increase the charging efficiency in the wireless charging system, it is necessary that a distance between the transmitting unit and the receiving unit during the charging be narrowed to thereby increase the coefficient of magnetic coupling as much as possible. With regard to a technique which was made in the light of this respect, one is known as follows. The transmitting unit (primary side coupler) is stored in a storage room (concave portion) provided on the surface of the earth. A lifting mechanism which is driven by a motor is connected to the transmitting unit. Also, the transmitting unit is ascended by the lifting mechanism to thereby reduce the distance with a receiving unit (secondary side coupler) installed in the electric moving vehicle (refer to JP-2000-152512-A). In addition, there is known another one with which a permanent magnet is disposed on a side of a facing surface of at least one of the transmitting unit or the receiving unit and a gap between the transmitting unit and the receiving unit is narrowed due to the magnetic attractive force of the permanent magnet (refer to JP-2008-120357-A and JP-2008-215028-A).

PRIOR ART DOCUMENTS

Patent Documents

Patent Document 1: JP-4356844-B
Patent Document 2: JP-2000-152512-A
Patent Document 3: JP-2008-120357-A
Patent Document 4: JP-2008-215028-A

SUMMARY OF THE INVENTION

Problem to be Solved by the Invention

However, the technique disclosed in Patent Document 2 requires the operation for moving the transmitting unit toward the receiving unit. For this reason, there is concern about an increase in charging time. Also, since a driving mechanism and a control mechanism for controlling the driving mechanism are specially required, system might be complicated to be expensive.

In the techniques disclosed in Patent Documents 3 and 4, a permanent magnet, additionally disposed on a facing side of either one of or both of the transmitting unit and the receiving unit, are so strong that the transmitting unit and the receiving unit are attracted to each other. For this reason, it is concerned that the permanent magnets may attract magnetic rubbish (such as a nail and a scrap of iron) and further may exert a negative influence on an electronic apparatus such as a mobile phone. In order that the permanent magnets concerned will not fail to magnetically attract to each other, it is necessary to lower the receiving unit to a height position of the transmitting unit. In particular, it is feared that the transmitting unit of the electric operation machine which protrudes over the road surface may collide with other structures.

The present invention has been made in the light of the problems described above, and it is therefore an object of the present invention to provide a wireless charging system which is capable of increasing the coefficient of magnetic coupling between a transmitting unit and a receiving unit during charging with a simple structure.

Means for Solving the Problem

In order to achieve the object described above, according to an aspect of the present invention, there is provided a wireless charging system including: a first winding portion which is formed by winding an electric wire; a second winding portion which is formed by winding an electric wire and is disposed with an interval between the first winding portion and the second winding portion in an axial direction of the first winding portion; and a pair of magnetic members which are disposed so as to sandwich the first winding portion and the second winding portion in the axial direction. In this case, at least one of the pair of magnetic members includes a protrusion portion which protrudes toward the other magnetic member opposed to the magnetic member in the axial direction. Also, at least one of the pair of magnetic members is held so as to be able to move forward and backward separately from the first winding portion or the second winding portion toward the opposed other magnetic member in the axial direction.

Effects of the Invention

According to the present invention, since the coefficient of magnetic coupling between a transmitting unit and a receiving unit during charging increases, it is possible to improve the charging efficiency.

MODES FOR CARRYING OUT THE INVENTION

Figure 1:
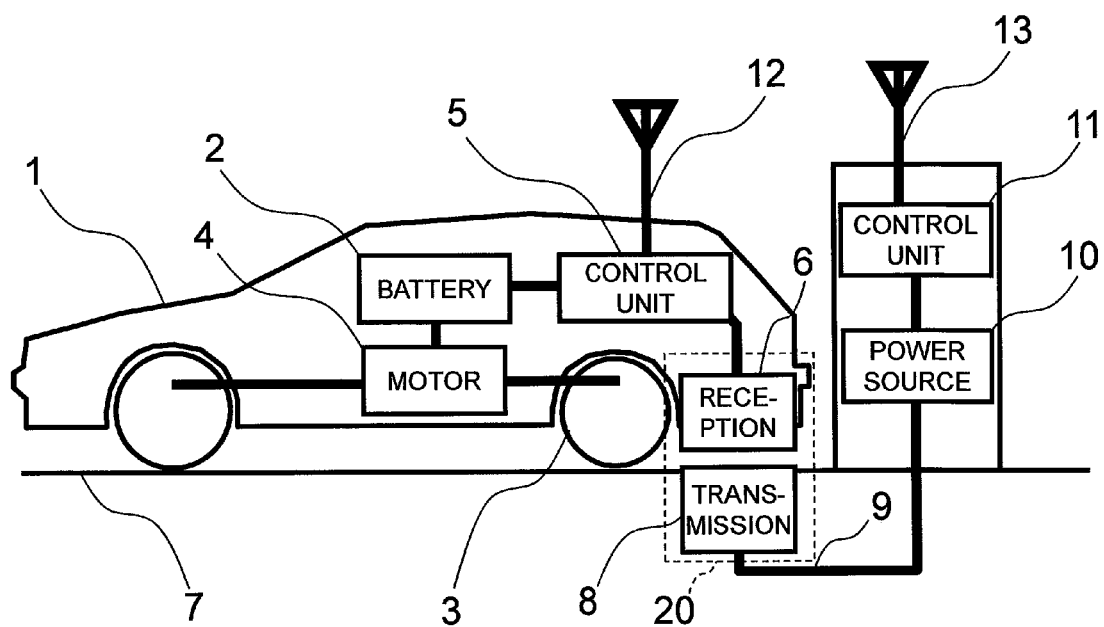
FIG. 1 is a diagram of an entire configuration of a wireless charging system according to a first embodiment of the present invention.

Hereinafter, embodiments of the present invention will be described in detail with reference to the drawings. FIG. 1 is a diagram showing an entire configuration of a wireless charging system according to a first embodiment of the present invention. The wireless charging system shown in the figure includes a receiving unit (electric power receiving unit) 6 connected to a secondary battery 2, and a transmitting unit (electric power feeding unit) 8 for supplying electric power to the receiving unit 6 in wireless by use of a mutual interaction of the electromagnetic induction. In this case, although a description will now be given by exemplifying an electric operation machine 1 (for example, an electric vehicle shown in FIG. 1, a train or monorail which travels along a rail, or other vehicles) which is driven by the secondary battery 2 as a movable body which is loaded with the secondary battery 2 and the receiving unit 6, the wireless charging system according to the present invention can be applied to a movable body as long as the movable body includes a chargeable battery.

The receiving unit 6 including a winding portion 18 and a magnetic material portion 14 is connected to the secondary battery 2 through a reception side control unit 5. The electric power supplied from the transmitting unit 8 is stored in the secondary battery 2. The electric power stored in the secondary battery 2 is then supplied to a motor 4 which is mechanically coupled to a wheel 3 to thereby drive the motor 4, making the electric operation machine 1 travel as a consequence.

A control unit 5 serves to mainly execute processing about charging control for the secondary battery 2. An antenna 12 is connected to the control unit 5. The antenna 12 gives and receives various pieces of information such as start and end of the charging for the secondary battery 2, and status (such as temperatures and relative positions of the winding portions 18, 15) of the receiving unit 6 and the transmitting unit 8 between an antenna 13 (which will be described later) of the transmitting unit 8 and the antenna 12.

Note that, the receiving unit 6 shown in FIG. 1 is installed at the bottom surface of the electric operation machine 1 so as to face a ground 7 in which the transmitting unit 8 is embedded. However, all it takes is that the receiving unit 6 is disposed so as to face the transmitting unit 8. Also, the receiving unit 6 may be installed in any other place so as to correspond to the installation position of the transmitting unit 8. For example, when the transmitting unit 8 is installed on the side surface of the electric operation machine 1, it is only necessary to install the receiving unit 6 on the side surface of the electric operation machine 1 in such a way that the receiving unit 6 faces the transmitting unit 8. When the transmitting unit 8 is installed above the electric operation machine 1, it is only necessary to install the receiving unit 6 on the upper surface of the electric operation machine 1.

The transmitting unit 8 including a winding portion 15 and a magnetic material portion 21 (both of which will be described later) is connected to a power source 10 through a cable (electric power line) 9. The power source 10 is connected to an electric power feeding control unit 11. The control unit 11 serves to mainly execute processing about the control for the electric power feeding to the receiving unit 6. An antenna 13 is connected to the control unit 11. When the secondary battery 2 is intended to be charged with the electricity the way in the example shown in FIG. 1, the electric operation machine 1 is made to stand still in such a way that the receiving unit 6 faces the transmitting unit 8 embedded in the ground 7. It is noted that although the transmitting unit 6 shown in FIG. 1 is embedded in the ground (road surface) 7, the transmitting unit 6 may be installed in any other place as long as it is disposed so as to face the receiving unit 6 in the manner described above.

Figure 2:
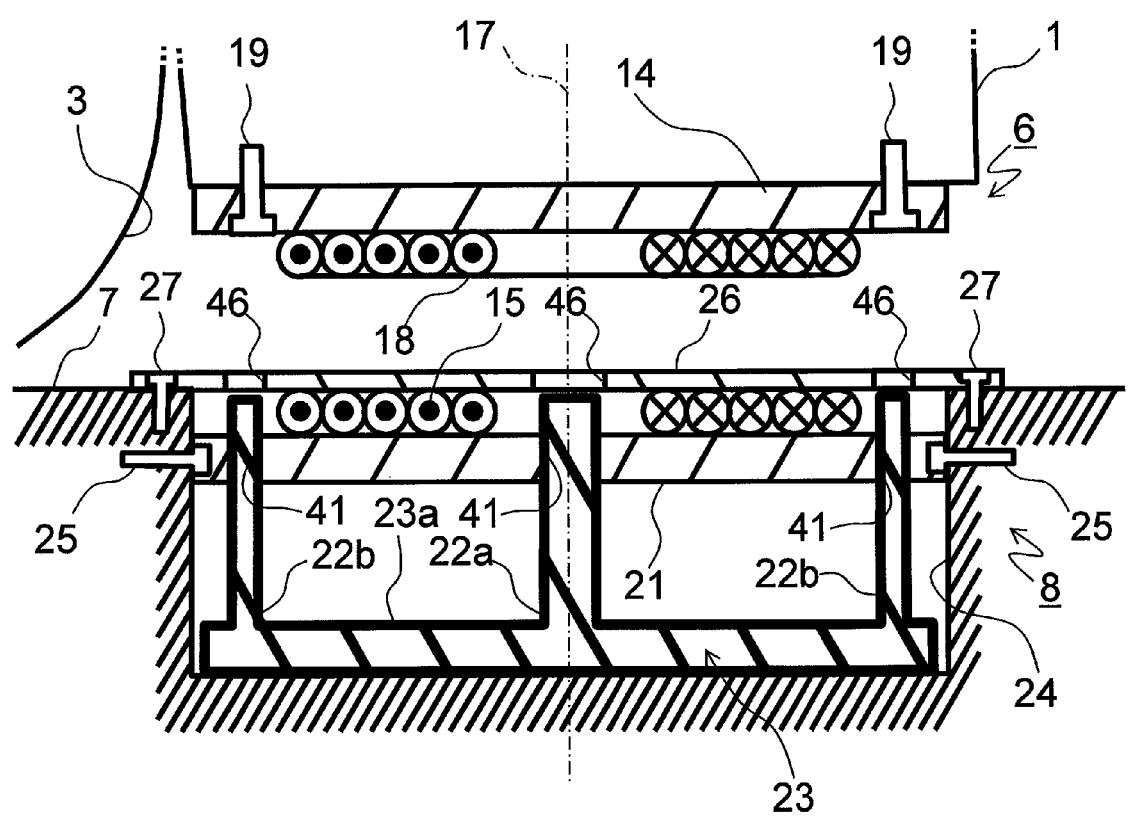
FIG. 2 is an enlarged view of a circumference of a receiving unit 6 and a transmitting unit 8 according to the first embodiment of the present invention (non-charging state).
Figure 3:
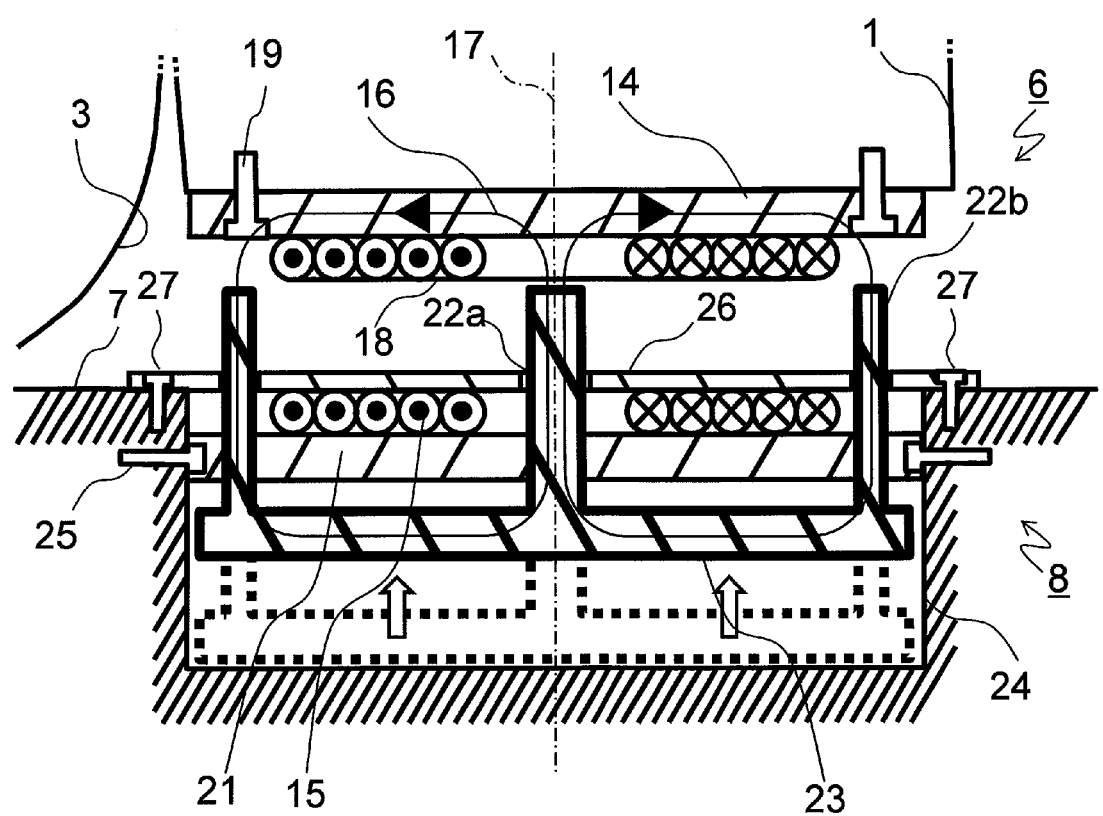
FIG. 3 is an enlarged view of the circumference of the receiving unit 6 and the transmitting unit 8 according to the first embodiment of the present invention (during charging).

A description will now be given with respect to a detailed structure of the circumference (a region 20 indicated by a broken line in FIG. 1) of the receiving unit 6 and the transmitting unit 8 according to the first embodiment of the present invention. FIGS. 2 and 3 are respectively enlarged views of the circumference of the receiving unit 6 and the transmitting unit 8 according to the first embodiment of the present invention. FIG. 2 shows a state in which the winding portion 15 is being de-energized of the transmitting unit 8 (that is, a non-charging state), and FIG. 3 shows a state in which the winding portion 15 is being energized at the transmitting unit 6 (that is, a state during the charging). It is noted that in FIGS. 2 and 3, the same portions and units as those in FIG. 1 are designated by the same reference numerals or symbols, and a description thereof may be suitably omitted in some cases (this also applies to each of figures following FIGS. 2 and 3).

In these figures, the receiving unit 6 includes a magnetic member 14 made of a magnetic material and an approximately flat-shaped winding portion (secondary coil) 18 which is formed by wiring an electric wire around a predetermined axis (a central axis 17 in the example shown in FIGS. 2 and 3). The winding portion 18 is adhered to the magnetic member 14 by use of an adhesive agent such as a resin. Moreover, the winding portion 18 is provided so as to be located in an outer side (outer surface side) of the electric operation machine 1 with respect to the magnetic member 14 in such a way that the winding portion 18 can face the winding portion 15 of the transmitting unit 8 which is installed outside the electric operation machine 1 on the same axis.

The magnetic member 14 according to this embodiment is formed in a plate-like shape, and is approximately horizontally mounted to a bottom surface of the electric operation machine 1 by means of a fixing bracket 19. In addition, the winding portion 18 according to this embodiment is approximately horizontally adhered to a lower surface (a surface on the ground 7 side) of the magnetic member 14 so as to be able to face the winding portion 15 on the side of the transmitting unit 8 which is fixed approximately horizontally on the same axis 17. It is noted that if the winding portion 18 is installed in such a manner, then, since it is avoided for the winding portion 18 to protrude from the electric operation machine 1, it is possible to suppress that an obstacle collides with the winding portion 18.

It is noted that the advantages of the present invention will not be lost even when the magnetic member 14 and the winding portion 18 are fixed to a member (not shown) made of a non-magnetic material according to necessity. In this case, it is preferable that the non-magnetic member concerned be formed in a plate-like shape, and be fixed to the bottom surface of the electric operation machine 1 by use of the fixing bracket 20, for example.

The transmitting unit 8 includes a magnetic member 23 made of a magnetic material, an approximately flat-shaped winding portion (primary coil) 15 which is formed by winding an electric wire around a predetermined axis (a central axis 17 in the example of FIG. 2 and FIG. 3), and a non-magnetic member 21 made of a non-magnetic material.

In the status shown in FIGS. 2 and 3, the winding portion 15 is disposed through a predetermined interval from the winding portion 18 in the central axis 17 direction. The magnetic member 23 composes, together with the magnetic member 14 of the receiving unit 6, a pair of magnetic members which are disposed so as to sandwich the winding portion 18 and the winding portion 15 from both sides of the central axis 17. Moreover, the magnetic member 23 includes a protrusion portion 22 (a central protrusion portion unit 22*a* and an outer circumferential protrusion portion 22*b*) which protrudes toward the magnetic member 14 opposed to the magnetic member 23 in the central axis 17 direction. The magnetic member 23 is held movably to both forward and backward in the central axis 17 direction separately from the winding portion 18 or the winding portion 15. As a consequence, when the winding portion 15 is energized, as shown in FIG. 3, the magnetic member 23 can be moved upward due to the magnetic attractive force against the gravity.

The winding portion 15, the magnetic member 23, and the non-magnetic member 31 are stored in a concave portion 24 provided in the ground 7. The concave portion 24 is covered with a cover 26 made of a non-magnetic material. The cover 26 is fixed to the ground 7 by means of a fixing bracket 27. Inside the concave portion 24, the winding portion 15 is located in the position closest to the surface of the earth (the cover 6) so as to be able to face the winding portion 18 of the receiving unit 6 on the same axis. The non-magnetic member 21 and the magnetic member 23 are disposed in this order toward a direction (that is, the bottom surface of the concave portion 24) being away from the surface of the earth with the winding portion 15 as a reference. A plurality of holes 46, 41 are provided in the cover 26 and the non-magnetic member 21 in positions corresponding to the protrusions 22 of the magnetic member 23.

The non-magnetic member 21 according to this embodiment is formed in a plate-like shape, and is approximately horizontally installed inside the concave portion 24 by means of a fixing bracket 25. Moreover, the winding portion 15 according to this embodiment is approximately horizontally adhered to the upper surface of the non-magnetic member 21 with the use of either an adhesive agent or a fixture (not shown) so as to be able to face the winding portion 18 on the receiving unit 6 side on the same axis 17.

It is noted that with regard to the material of the winding portions 18, 15 in the receiving unit 6 and the transmitting unit 8, a litz wire or the like is preferable from a viewpoint of reducing an eddy-current loss due to a skin effect. In addition, a material showing a so-called ferromagnetic property is suitable as the material of the magnetic members 14, 23; yet ferrite or the like is more preferable from a viewpoint of restraining the eddy current. Furthermore, a fiber-reinforced plastic or the like as a non-magnetic material showing a high resistance is suitable as the material of the non-magnetic member 21 in the transmitting unit 8.

Figure 4:
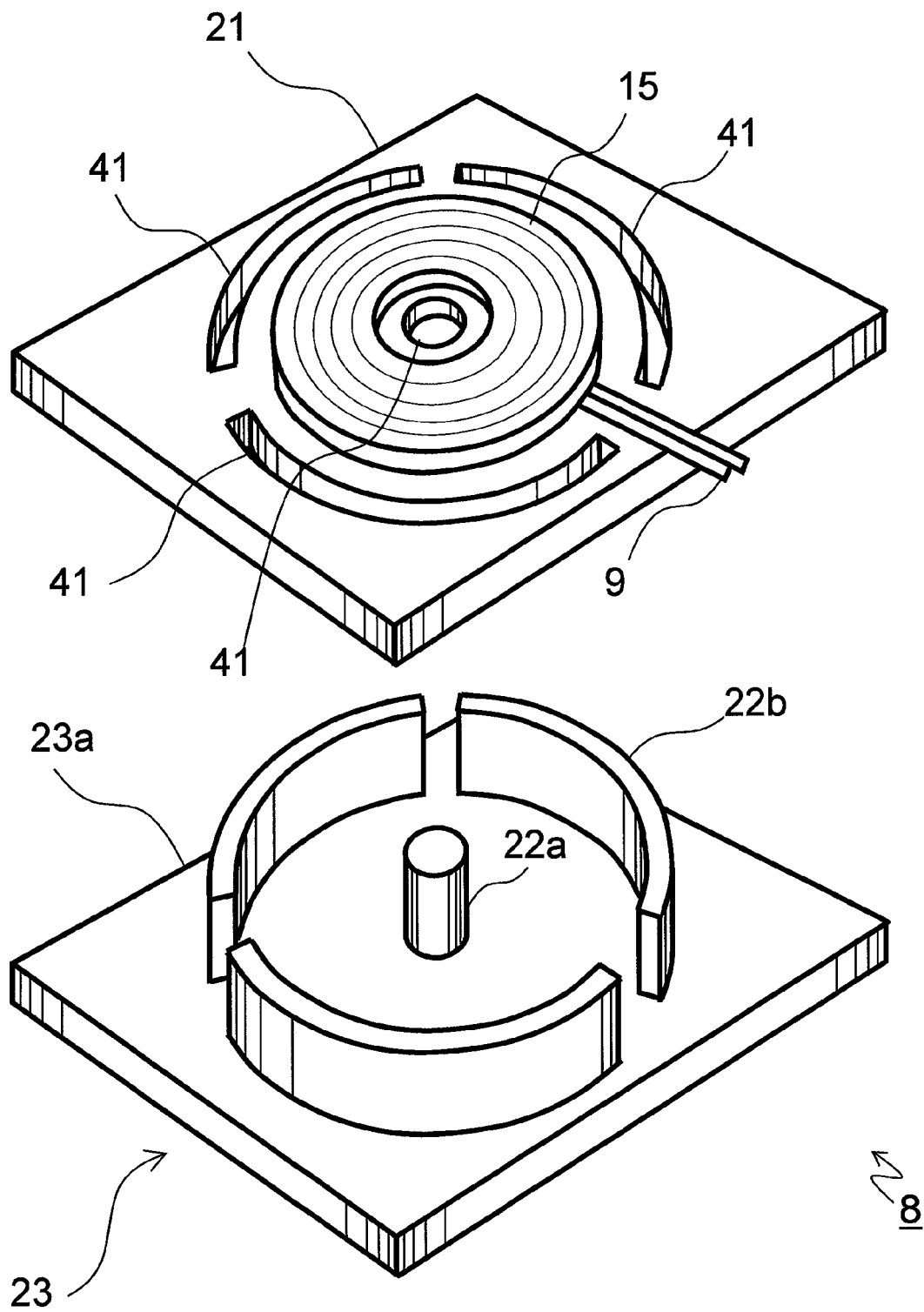
FIG. 4 is a perspective view of a winding portion 15, a non-magnetic member 21, and a magnetic member 23 according to the first embodiment of the present invention (non-charging state).
Figure 5:
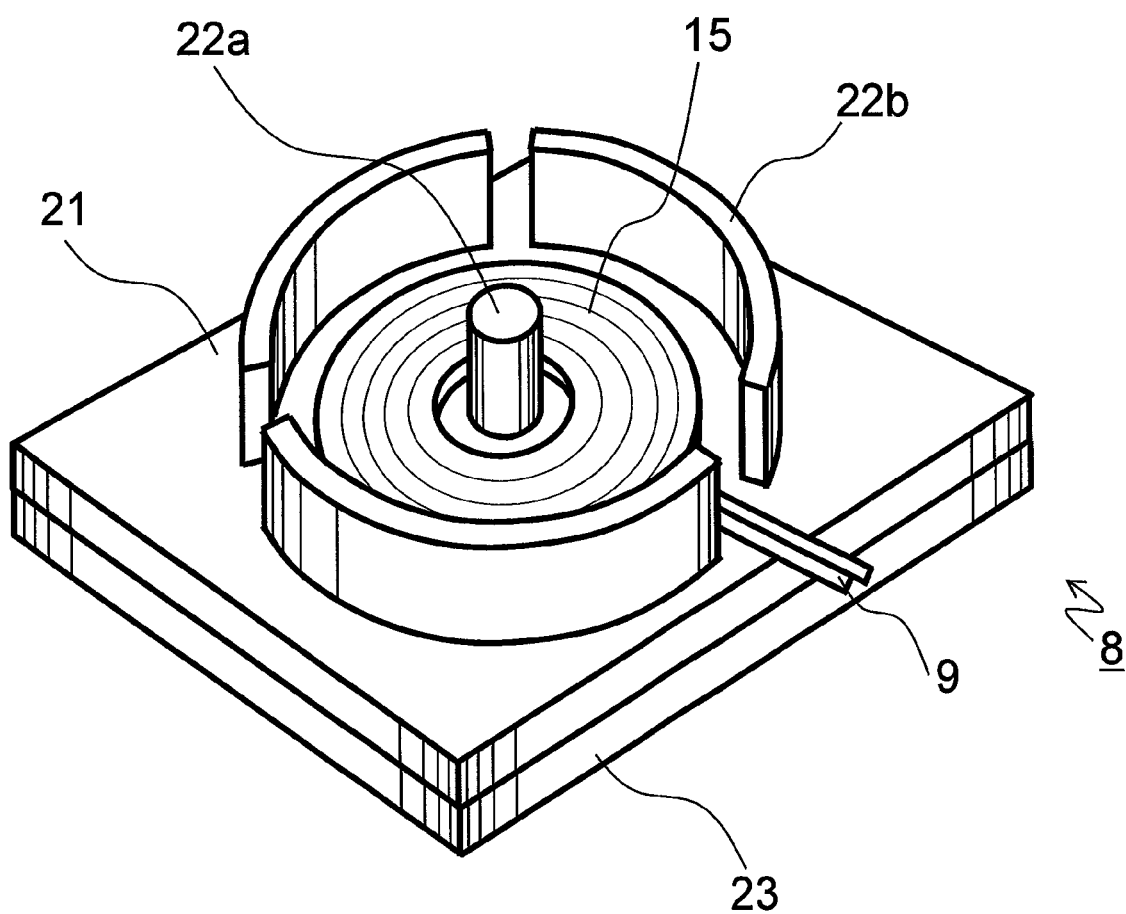
FIG. 5 is a perspective view of the winding portion 15, the non-magnetic member 21, and the magnetic member 23 according to the first embodiment of the present invention (during charging).

FIG. 4 and FIG. 5 are perspective views of the winding portion 15, the non-magnetic member 21, and the magnetic member 23 according to the first embodiment of the present invention. FIG. 4 shows a state in which the winding portion 15 is being de-energized (that is, a non-charging state), and FIG. 5 shows a state in which the winding portion 15 is being energized (that is, a state during the charging).

As shown in these figures, the magnetic member 23 according to this embodiment includes a main body portion 23*a* which is formed in a plate-like shape, and a protrusion portion 22 which protrudes upward from the main body portion 23*a*. In an example shown in these figures, a central protrusion portion 22*a* which is provided so as to extend through a hollow portion of the winding portion 15, and an outer circumferential protrusion portion 22*b* which is provided so as to extend through an outer circumferential portion of the winding portion 15 are provided as the protrusion portion 22. The central protrusion portion 22*a* shown in the figures is formed in an approximately columnar-like shape which is provided on the same axis as that of the central axis 17. A diameter of the central protrusion portion 22*a* is set smaller than that of the hollow portion of the winding portion 15. The outer circumferential protrusion portion 22*b* shown in the figures is obtained by dividing a columnar side surface having a diameter larger than that of the winding portion 15 into approximately three parts.

Note that, in the example shown in the figures, the central protrusion portion 22*a* and the outer circumferential protrusion portion 22*b* are both provided from a viewpoint of enhancing the charging efficiency. However, if any one of the protrusion portions 22*a* and 22*b* is provided, an interval of a pair of magnetic members 23, 14 in the central axis 17 direction can be smaller, which contributes to the enhancement of the charging efficiency. Moreover, all it takes is that the central protrusion portion 22*a* and the outer circumferential protrusion portion 22*b* can shorten the distance of the gap defined between the paired magnetic members 23, 14, and thus any other suitable shapes other than the shapes shown in the figures can be substituted for those. For example, something obtained by changing the number of division of the columnar side surface, something obtained by assembling a plurality of columns, something into which magnetic needles are assembled so as to stand close together, or something provided only in a part of the outer periphery of the winding portion 15, can also be used as the outer circumferential protrusion portion 22*b*.

It is noted that when the magnetic member 23 is attracted by the magnetic field generated in the phase of the energization of the winding portion 15 to be moved upward, heights of the central protrusion portion 22a, the outer circumferential protrusion portion 22b are preferably set in such a way that at least one of the protrusion portion 22a or 22b comes in contact with the magnetic member 14 from a viewpoint of enhancing the coefficient of magnetic coupling to realize a higher charging efficiency. However, since the coefficient of magnetic coupling is enhanced even when no protrusion portion 22 comes in contact with the magnetic member 14, the charging efficiency can be improved as compared with conventional ones.

A plurality of holes 41 are processed in the positions corresponding to the protrusion portions 22a, 22b in the non-magnetic member 21. If the holes 41 are provided in the non-magnetic member 21 in such a manner, then, as shown in FIG. 2 and FIG. 5, the magnetic member 23 can be held inside the concave portion 24 in a state in which the protrusion portions 22a, 22b are put into the holes 41. It is consequently possible to restrain the rotation of the magnetic member 23 around the central axis 17 with the use of the non-magnetic member 21. At the same time, the non-magnetic member 21 can be used as a guide for regulating a movement direction when the magnetic member 23 is being moved upward.

Next, referring back to FIG. 1, a description will be given with respect to a procedure of method of charging the secondary battery 2 with the wireless charging system according to the first embodiment which is configured in the manner as described above. A driver of the electric operation machine 1 moves the electric operation machine 1 in such a way that a relative distance between the transmitting unit 8 and the receiving unit 6 which is detected through the antennas 12 and 13 falls within a predetermined range, and then carries out the positioning of the electric operation machine 1. The paired winding portions 15 and 18 in the transmitting unit 8 and the receiving unit 6 are thereby disposed so as to face each other.

Next, an energization start instruction is issued from the transmission side control unit 11 to the power source 10 in accordance with following instructions: an instruction issued by the driver of the electric operation machine 1; an instruction from the software which was previously set on the basis of information on the relative distance between the transmitting unit 8 and the receiving unit 6; and an instruction directly input from the operator, such as the driver, to the transmission side control unit 11. Consequently, an AC current having a predetermined frequency (for example, 10 kHz) is caused to flow through the winding portion 15 of the transmitting unit 8. At this time, the magnetic attractive force is generated due to the magnetic field which the winding portion 15 makes. This force makes the magnetic member 23 be attracted to the winding portion 15 side, such that the magnetic member 23 is moved from the position shown in FIG. 2 to the position shown in FIG. 3 to thereby approach the magnetic member 14. It is noted that this state can be attained with requiring neither a special driving mechanism for causing the magnetic member 23 to approach the magnetic member 14 nor a control mechanism for controlling the same. A special operation is not necessary either.

An induced current is then caused to flow through the winding portion 18 on the receiving unit 6 side owing to an electromagnetic induction action by an alternate magnetic field which the winding portion 15 on the transmitting unit 8 side makes and which interlinks the winding portion 18 on the receiving unit 6 side. Subsequently, the induced current is then caused to flow through a rectifier (not shown) mounted to the electric operation machine 1 to thereby charge the secondary battery 2 with the electricity originating therefrom. At this time, the protrusion portion 22 (22a, 22b) of the magnetic member 23 which has been attracted due to the magnetic attractive force protrudes from the hole 46 of the cover 26 to thereby approach the magnetic member 14 of the transmitting unit 6. That is to say, the protrusion portion 22 is moved into the gap defined in the central axis 17 direction by means of the pair of winding portions 15, 18, the protrusion portion 22 being moved due to the magnetic attractive force. As a result, almost all of the magnetic force lines 16 (refer to FIG. 3), which the winding portions 15, 18 of the transmitting unit 8 and the receiving unit 6 make, pass through the magnetic member 14, the protrusion portion 22, and the magnetic member 23 each having the low magnetic resistance. Therefore, the coefficient of magnetic coupling between the transmitting unit 8 and the receiving unit 6 is enhanced to thereby improve the charging efficiency.

When the secondary battery 2 has been charged with a predetermined amount of electricity, the control unit 5 on the receiving unit 6 side either detects this state, or the control unit 5 on the receiving unit 6 side receives an end instruction issued by the operator. Consequently, a command about the energization end is transmitted to the control unit 11 of the transmitting unit 8 through the antennas 12 and 13. Then, the control unit 11 transmits a signal about the energization end to the power source 10 (otherwise, the energization by the power source 10 may be ended in accordance with a direct end instruction issued to the control unit 11 by the operator). Since the winding portion 15 being energized at the transmitting unit 6 side is thereby terminated, the magnetic attractive force between the winding portion 15 and the magnetic member 23 disappears. Thus, the magnetic member 23 is descended inside the concave portion 24 to return back to the original position (the position shown in FIG. 2) by the deadweight of the magnetic member 23. As a result, the upper end of the protrusion portion 22 is moved downward (to the inside of the concave portion 24) with respect to the cover 26 (refer to FIG. 3). That is to say, when the winding portion 15 is being de-energized, the protrusion portion 22 is located outside the gap defined between the paired winding portions 15, 18. As a result, the protrusion portion 22 is prevented from protruding to the outside to become the obstacle.

Here, to assist in understanding the advantages of the present invention, a description will now be given with respect to a wireless charging system according to a comparative example of the present invention with reference to FIG. 6 and FIG. 7.

Figure 6:
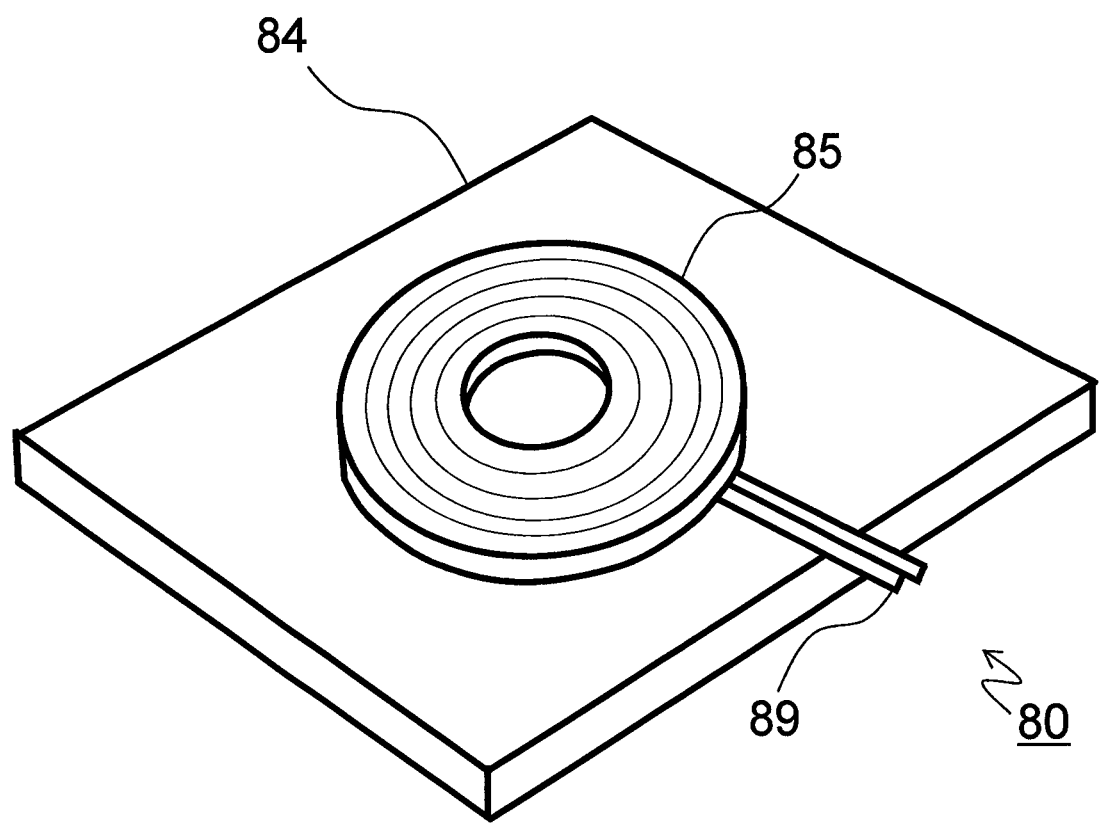
FIG. 6 is a perspective view of a main portion of a transmitting unit 80 in a wireless charging system according to a comparative example of the present invention.

FIG. 6 is a perspective view of a main portion of a transmitting unit in the wireless charging system according to the comparative example concerned. It is noted that since a receiving unit 60 (refer to FIG. 7) has approximately the same external appearance as that of a transmitting unit 80, a description thereof is omitted here. The transmitting unit 80 shown in this figure is mainly composed of a magnetic member 84 and a winding portion 85. The winding portion 85 is connected to a cable 85 extending to a power source.

Figure 7:
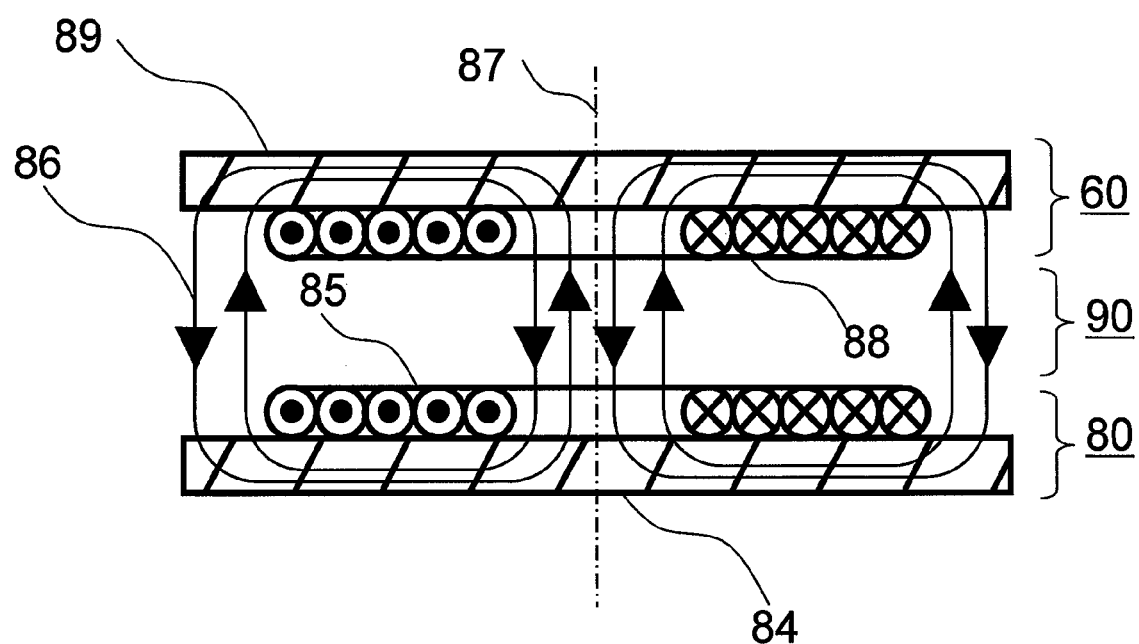
FIG. 7 is a view showing a cross section of the transmitting unit 80 and a receiving unit 60 during power feeding in the wireless charging system according to the comparative example of the present invention and magnetic force lines 86.

FIG. 7 is a view showing cross sections of the transmitting unit 80 and the receiving unit 60, and further showing magnetic force lines 86 during the power feeding. The magnetic force lines 86 are divided into a part along a central axis 87 between the winding portion 85 and the winding portion 88, a part along a surface direction within a magnetic member 89, a part extending from a peripheral portion of the winding portion 88 to a peripheral portion of the winding portion 85, and a part along a surface direction within the magnetic member 84. However, as can be seen from FIG. 7, in the wireless charging system according to this comparative example concerned, a gap 90 is undesirably defined between the winding portion 85 and the winding portion 88. Therefore, the coefficient of magnetic coupling is reduced to thereby lower the charging efficiency.

Meanwhile, according to this embodiment configured as described above, the protrusion portion 22 provided in the magnetic member 23 enables an interval of the gap defined between the paired winding portions 15, 18 to be smaller than that in the comparative example described above. The charging efficiency can be enhanced consequently. In addition, according to this embodiment, the position of the magnetic member 23 can be changed without providing a particular driving mechanism or a particular control mechanism. Therefore, it is possible to configure the transmitting unit 8 and the receiving unit 6 which have the high magnetic coupling between them. As a result, it is possible to realize the higher electric power feeding efficiency than that in the prior art without requiring the new driving mechanism with the control mechanism while the convenience of the wireless charging which is free from the getting on/off of the driver and the cable detachable and attachable operation is enjoyed. Thus, it is possible to realize the higher power feeding efficiency than that in the prior art, further achieving the charging that requires the shorter time.

Furthermore, the excellent power feeding efficiency enables the lower cost to be realized according to this embodiment. That is to say, according to this embodiment, since the charging time equal to that in the prior art can be attained with the less current in power feeding than that in the prior art, the thin conductor which is more inexpensive than conventional ones can be applied as the conductor of the winding portions 15 and 18. In addition, a power source 10 which outputs a lower electric power and is more inexpensive than those in conventional ones is applicable as the power source 10. The magnetic member 23 and the protrusion portion 22 are disposed on the magnetic circuit, which enables almost all the magnetic force lines made by the transmitting unit 8 and the receiving unit 6 to pass through the ferromagnetic material. Thus, the leaked magnetic field to the circumferences can be reduced.

Furthermore, if the wireless charging system according to this embodiment is used, then, a closed magnetic circuit can be formed by the protrusion portion 22. Therefore, a distance between the transmitting unit 8 and the receiving unit 6 can be made large in a time zone other than the phase of the charging. As a result, it is possible to reduce the fear that the receiving unit 6 collides with the obstacle on the road surface, and the transmitting unit 8 collides with the transportation on the road surface.

Figure 8:
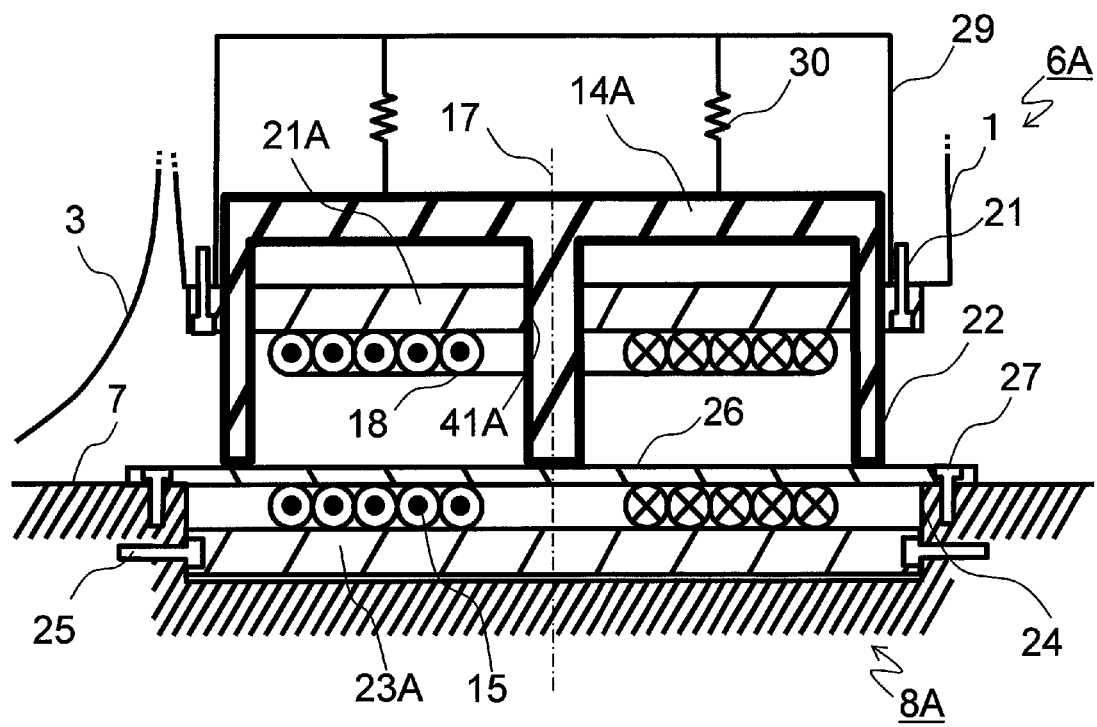
FIG. 8 is an enlarged view of a circumference of a receiving unit 6A and a transmitting unit 8A according to a second embodiment of the present invention (during charging).

A description will now be given with respect to another embodiment of the present invention. FIG. 8 is an enlarged view of a circumference of a receiving unit 6A and a transmitting unit 8A according to a second embodiment of the present invention. Since an entire configuration of a wireless charging system according to this embodiment is the same as that shown in FIG. 1, only an enlarged view of a region 20 different therefrom in configuration is shown. FIG. 8 shows a state in which the winding portion 15 is being energized at the transmitting unit 8A (during charging). Thus, a magnetic member 14A is attracted toward the winding portion 15 against a restoring force (tensile force) of a spring 30.

As shown in this figure, the wireless charging system according to this embodiment includes the transmitting unit 8A and the receiving unit 6A. The transmitting unit 8A includes an approximately flat-like shaped magnetic member 23A. The winding portion 15 is adhered to the upper surface of the magnetic member 23A by means of an adhesive agent such as a resin, or the like. The members composing the transmitting unit 8A are stored inside the concave portion 24. The magnetic member 23A is fixed to the wall surface of the concave portion 24 through the fixing bracket 25. The concave portion 24 is covered with the cover 26. The advantages of the present invention can be obtained even when the magnetic member 23A and the winding portion 15 are fixed to a non-magnetic member (not shown) according to necessity. It is noted that in this case, preferably, the non-magnetic member concerned is fixed to the wall surface of the concave portion 24 by use of the fixing bracket 25.

The receiving unit 6A includes the winding portion 18, a non-magnetic member 21A having a lower surface to which the winding portion 18 is adhered with an adhesive agent such as a resin, and the magnetic member 14A which is held so as to be able to move forward and backward in the direction of the central axis 17 separately from the winding portion 18 or the winding portion 15. The magnetic member 14A has the protrusion portion 22 similarly to the magnetic member 23 of the first embodiment. The protrusion portion 22 is held in a state in which it is put into a hole 41A which is processed in the non-magnetic member 21A.

The non-magnetic member 21A is fixed to the bottom surface of the electric operation machine 1 by means of a support bracket 21. The magnetic member 14A is stored in the concave portion 29 provided inside the electric operation machine 1, and is supported through the spring 30 mounted to the upper surface of the concave portion 29. The spring (biasing means) 30 biases the magnetic member 14A which is held so as to be able to move forward and backward toward the magnetic member 23A in the direction away from (that is, upward) from the magnetic member 23A. As a result, in the state in which the winding portion 15 is being de-energized of the transmitting unit 8A (in non-charging state), the magnetic member 14A is held inside the concave portion 29 in such a position that the protrusion portion 22 does not obstacle the traveling of the electric operation machine 1. It is noted that as the biasing means for the magnetic member 14A, an elastic body other than the spring 30 shown in FIG. 8 may also be used.

Since a charging procedure in this embodiment is approximately the same as that in the first embodiment, only a different part between them will be described below. When the winding portion 15 in this embodiment configured as described above is energized, an induced current is caused to flow through the winding portion 18 due to the electromagnetic induction action. Also, the magnetic attractive force is generated by the magnetic field which the winding portion 18 makes, and the magnetic member 14A is attracted to the winding portion 18 side, so that the lower end of the protrusion portion 22 approaches the transmitting unit 8 (the cover 26). As a result, almost all the magnetic force lines 16, which the winding portions 15, 18 of the transmitting unit 8 and the receiving unit 6 make, pass through the magnetic member 14A, the protrusion portion 22, and the magnetic member 23A each showing the low magnetic resistance. Therefore, it is possible to increase the coefficient of magnetic coupling between the transmitting unit 8 and the receiving unit 6. Meanwhile, when the charging has been completed and thus the magnetization for the winding portion 18 goes off, the magnetic attractive force which has acted on the magnetic member 14A disappears, and the magnetic member 14A returns to the position before the charging due to the restoring force of the spring 30.

Accordingly, the same advantages as those in the first embodiment can be offered in this embodiment as well. In particular, when the magnetic member 14A is supported by the spring 30 as with this embodiment, the magnetic member 14A can be securely returned to the position (initial position) before the charging after completion of the charging. For this reason, as compared with the first embodiment, a point that it is possible to reduce the possibility that the protrusion portion 22 remains as the obstacle on the road surface or the like is an advantage.

It is noted that although in this embodiment, the description has been given with respect to the case where the magnetic member 14A on the receiving unit 6A side is held so as to be able to move forward and backward in the axis 17 direction by use of the spring 30, alternatively, the magnetic member on the transmitting unit side may be held so as to be able to move forward and backward. Moreover, a structure in which the first embodiment and the second embodiment are combined with each other, that is, a structure may be adopted in which the magnetic members in the transmitting unit and the receiving unit are held so as to be able to move forward and backward in the axis direction 17. In addition, in this case, similarly to the case of the magnetic member 14A which is supported by the spring 30 disclosed in the second embodiment, the ferromagnetic member 23 on the transmitting unit side may be supported inside the concave portion 24 with the use of a spring.

Figure 9:
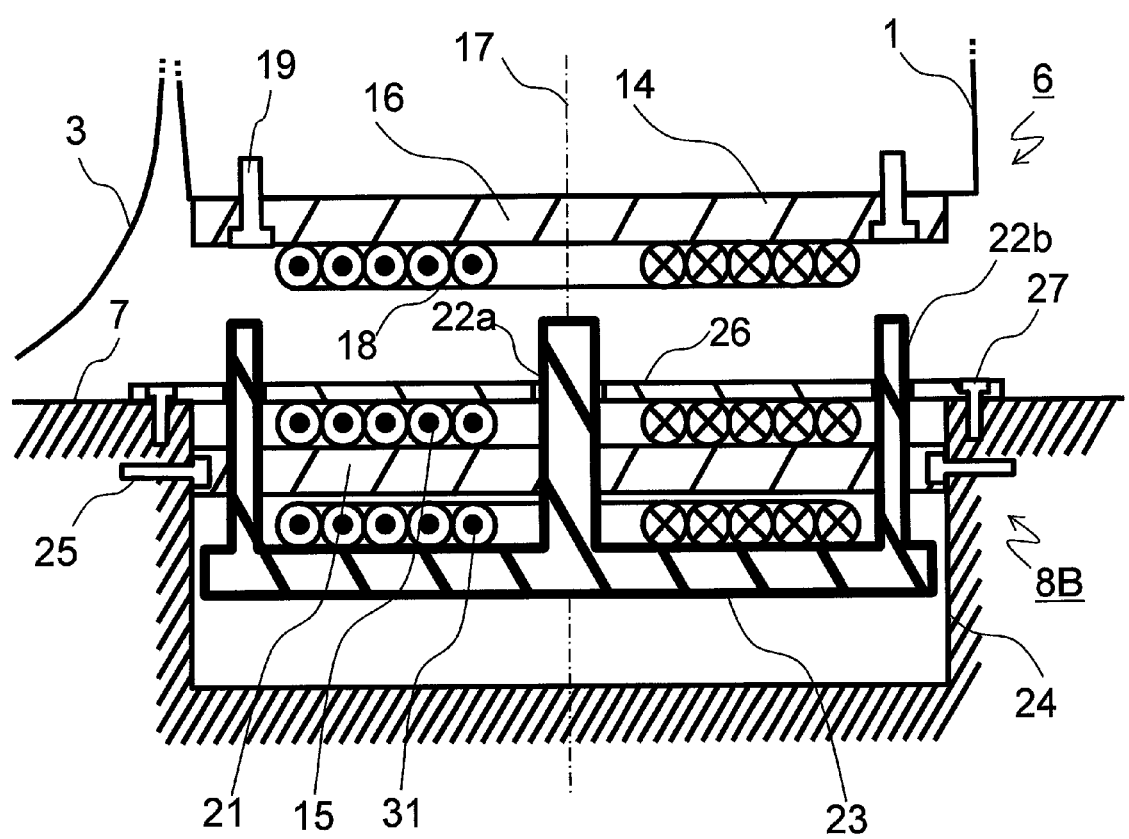
FIG. 9 is an enlarged view of a circumference of a receiving unit 6 and a transmitting unit 8B according to a third embodiment of the present invention (during charging).

FIG. 9 is an enlarged view of a circumference of a receiving unit 6 and a transmitting unit 8B according to a third embodiment of the present invention. Since an entire configuration of a wireless charging system according to this embodiment is the same as that shown in FIG. 1, only an enlarged view of a region 20 different therefrom in configuration is shown. FIG. 9 shows a state in which the winding portion 15 is being energized at the transmitting unit 8B (during charging). A magnetic member 23 is being attracted toward the winding portions 15, 31 in FIG. 9.

This embodiment is different from the first embodiment in that a third winding portion 31 is provided so as to be located between the lower surface of the non-magnetic member 21 and the upper surface of the magnetic member 23 in the transmitting unit 8B, and two primary coils are provided. The winding portion 31 is connected in series with the winding portion 15 in such a way that the current is caused to flow in the same direction around the central axis 17. The winding portion 31 is adhered to the upper surface of the magnetic member 23 with either an adhesive agent such as a resin, or a fixing bracket (not shown). The protrusion portion 22a is inserted into the hollow portion of the winding portion 31. That is to say, the winding portion 31 is held so as to be able to move forward and backward together with the magnetic member 23 in the direction of the central axis 17, and can be relatively moved in the central axis direction 17 with respect to a pair of winding portions 15, 18. It is noted that from a viewpoint of suppressing the reduction of the magnetic attractive force, the non-magnetic member is preferably inserted between the winding portion 15 and the winding portion 31 as with this embodiment. A litz wire is suitable as the material of the winding portion 31, similarly to other winding portions 15, 18.

Since a charging procedure in this embodiment is approximately the same as that in the first embodiment, only a different part between them will be described below. When the winding portion 15 in this embodiment configured as described above is energized, the winding portion 31 is energized concurrently with that energization as well. At this time, an attractive force due to the Lorentz force acts on the winding portion 15 and the winding portion 31 between each other. In addition, the magnetic attractive force acts on the magnetic member 23 as well due to the magnetic field which the winding portion 15 makes. By the two kinds of attractive forces, the winding portion 31 and the magnetic member 23 are attracted to the winding portion 15 side, such that the upper end portion of the protrusion portion 22 approaches the receiving unit 6. As a result, almost all the magnetic force lines, which the winding portions 15, 18, 31 of the transmitting unit 8B and the receiving unit 6 make, pass through the magnetic member 14, the protrusion portion 22, and the magnetic member 23 each showing the low magnetic resistance. Therefore, it is possible to increase the coefficient of coupling between the transmitting unit 8B and the receiving unit 6. Meanwhile, when the charging has been completed and thus the magnetization for the winding portion 18 goes off, the magnetic attractive force which has acted on the magnetic member 23 disappears, and the magnetic member 23 returns to the position before the charging due to its own weight.

In particular, according to this embodiment, since the two winding portions 15, 31 are provided in the transmitting unit 8B, the weight of the object which is attracted to the receiving unit 6 side due to the magnetic attractive force is relatively heavier than the case of the first embodiment (that is, if simple comparison is made, then, the weight is heavier only by the winding portion 31). However, since the magnitude of the magnetic attractive force thus generated can be relatively increased, the charging efficiency can be further enhanced in this embodiment than in the first or second embodiment depending on the conditions. The same advantages as those in the first embodiment can also be offered at the same time.

Note that, in this embodiment, the description has been given with respect to the case where the winding portion 31 is provided between the pair of winding portions 15, 18, and the magnetic member 23 on the transmitting unit 8B side. However, instead of this arrangement, the winding portion 31 may be provided between a pair of winding portions 15, 18, and the magnetic member 14 on the receiving unit 6 side (that is to say, between the winding portion 15 and the magnetic member 14) as well.

In each of the embodiments described above, the description has been given with respect to the case where the protrusion portion 22 is provided in one (the magnetic member 23) of the paired magnetic members 14 and 23 which are disposed so as to sandwich a pair of winding portions 15, 18 in the axis 17 direction while the magnetic members 23 is held so as to be able to move forward and backward in the axis 17 direction. These arrangements are made from a viewpoint of prioritizing the structure that can be made with simple compositions and easy positioning of the electric operation machine 1 in the phase of the charging. However, as was described at the end of the description regarding the second embodiment, even when the protrusion portions 22 are provided in both of the paired magnetic members 14, 23 and both of the paired magnetic members 14, 23 are held so as to be able to move forward and backward, the present invention can offer the advantages thereof.

Furthermore, from a viewpoint of enhancing the charging efficiency, a surface on which either the paired magnetic members 14 or 23 which is held so as to be able to move forward and backward faces either the paired winding portions 15 or 18 which is the closer to the magnetic member is preferably larger than a circle having a diameter of either the paired winding portions 15 or 18 which is the closer to the magnetic member. The reason of this arrangement is because if the magnetic member has a large area, then the influence according to the magnetic attractive force which the winding portion generates can be greater. As a result, the relatively large protrusion portion 22 comes to be readily formed to thereby increase the possibility that the charging efficiency can be enhanced. In this embodiment, on the basis of this viewpoint, the magnetic member 23 is formed in the approximately plate-like shape, and the size of the plate concerned is made larger than that of the winding portion 15. That is to say, the entire circle having the diameter of the winding portion 15 can be projected on the magnetic member 23.

REFERENCE NUMERALS

1 . . . electric operation machine
2 . . . secondary battery
3 . . . receiving unit side control unit
6 . . . receiving unit (power receiving unit)
7 . . . ground
8 . . . transmitting unit (power feeding unit)
9 . . . cable
10 . . . power source
11 . . . transmitting unit side control unit
12, 13 . . . antenna
14 . . . magnetic member (receiving unit side)
15 . . . winding portion (primary coil)
16 . . . magnetic power line
17 . . . central axis
18 . . . winding portion (secondary coil)
19 . . . fixing bracket
21 . . . non-magnetic member
22 . . . protrusion portion
23 . . . magnetic member (transmitting side)
23a . . . main body portion (magnetic member)
24 . . . concave portion
25 . . . fixing bracket
26 . . . cover
27 . . . fixing bracket
29 . . . concave portion
30 . . . spring
31 . . . winding portion (primary coil)
41 . . . hole
46 . . . hole

The invention claimed is:

1. A wireless charging system comprising:
a first winding portion which is formed by winding an electric wire;
a second winding portion which is formed by winding an electric wire and is disposed with an interval between the first winding portion and the second winding portion in an axial direction of the first winding portion; and
a pair of magnetic members which are disposed so as to sandwich the first winding portion and the second winding portion in the axial direction,
wherein at least one of the pair of magnetic members includes a protrusion portion which protrudes toward the other magnetic member which faces the one of the pair of magnetic members in the axial direction,
wherein the at least one of the pair of magnetic members is held so as to be able to move forward and backward along the axial direction separately from the first winding portion or the second winding portion toward the other magnetic member which faces the one of the pair of magnetic members in the axial direction; and
wherein the protrusion portion is moved to a gap sandwiched between the first winding portion and the second winding portion in the axial direction due to an attractive force generated when one of the first winding portion and the second winding portion is energized, and the protrusion portion is located outside the gap when the one of the first winding portion and the second winding portion is de-energized.

2. The wireless charging system according to claim 1, wherein only one of the pair of magnetic members includes the protrusion portion and is held so as to be able to move forward and backward along the axial direction separately from the first winding portion or the second winding portion toward the other magnetic member.

3. The wireless charging system according to claim 1, wherein a surface, on which either the pair of magnetic members which is held so as to be able to move forward and backward faces either the first winding portion or the second winding portion which is closer to the magnetic member, is larger than a circle having a diameter of the either the first winding portion or the second winding portion which is closer to the magnetic member, the magnetic member being held separately from the first winding portion or the second winding portion toward the other magnetic member opposed to the magnetic member.

4. The wireless charging system according to claim 1, further comprising:
a third winding portion installed between the first winding portion and the second winding portion on one hand and one of the pair of magnetic members on the other hand,
wherein the one of the pair of magnetic members includes the protrusion portion and is held so as to be able to move forward and backward along the axial direction separately from the first winding portion or the second winding portion toward the opposed other magnetic member in the axis direction, and
wherein the third winding portion is held so as to be able to do relative movement in the axis direction with respect to the first winding portion and the second winding portion.

5. The wireless charging system according to claim 1, further comprising
biasing means for biasing the one of the magnetic members in a direction away from the other magnetic member, the one of the magnetic members being held so as to be able to move forward and backward along the axial direction separately from the first winding portion or the second winding portion toward the other of the pair of magnetic members.

6. The wireless charging system according to claim 1, wherein the at least one of the magnetic members which is held so as to be able to move forward and backward along the axial direction separately from the first winding portion or the second winding portion toward the other of the pair of magnetic members approaches the other of the magnetic members due to the attractive force which is generated when the one of the first winding portion and the second winding portion is energized.

* * * * *